United States Patent
Fujimoto

(10) Patent No.: US 7,167,356 B2
(45) Date of Patent: Jan. 23, 2007

(54) SOLID ELECTROLYTIC CAPACITOR

(75) Inventor: Kazumasa Fujimoto, Saga (JP)

(73) Assignees: Sanyo Electric Co., Ltd., Moriguchi (JP); Saga Sanyo Industries, Co., Ltd., Kishima-Gun (JP)

( * ) Notice: Subject to any disclaimer, the term of this patent is extended or adjusted under 35 U.S.C. 154(b) by 0 days.

(21) Appl. No.: 10/539,119

(22) PCT Filed: Jan. 30, 2004

(86) PCT No.: PCT/JP2004/000967

§ 371 (c)(1),
(2), (4) Date: Jun. 16, 2005

(87) PCT Pub. No.: WO2004/073000

PCT Pub. Date: Aug. 26, 2004

(65) Prior Publication Data

US 2006/0164793 A1    Jul. 27, 2006

(30) Foreign Application Priority Data

Dec. 2, 2003   (JP) .............................. 2003-033338

(51) Int. Cl.
H01G 9/00  (2006.01)

(52) U.S. Cl. ...................... 361/523; 361/508; 361/516; 361/525; 361/528; 361/532; 29/25.01

(58) Field of Classification Search ........ 361/523–525, 361/528–534, 502–504, 508–512, 516–519; 29/25.03, 25.01

See application file for complete search history.

(56) References Cited

U.S. PATENT DOCUMENTS

| | | | |
|---|---|---|---|
| 3,789,502 A * | 2/1974 | Callins et al. | ............. 29/25.03 |
| 6,052,273 A * | 4/2000 | Inoue et al. | ................ 361/523 |
| 6,375,688 B1 * | 4/2002 | Akami et al. | ............... 29/25.03 |
| 6,454,817 B1 * | 9/2002 | Shin et al. | ................... 361/523 |
| 6,515,847 B1 | 2/2003 | Naraya | |
| 6,579,327 B1 * | 6/2003 | Shiue et al. | ............... 29/25.03 |
| 2006/0018078 A1 * | 1/2006 | Fujimoto et al. | ........... 361/271 |

FOREIGN PATENT DOCUMENTS

| | | | |
|---|---|---|---|
| JP | 2-57329 | | 12/1990 |
| JP | 4-127635 | | 11/1992 |
| JP | 4071214 | * | 6/1997 |
| JP | 2000-114108 | | 4/2000 |

* cited by examiner

*Primary Examiner*—Nguyen T. Ha
(74) *Attorney, Agent, or Firm*—Armstrong, Kratz, Quintos, Hanson & Brooks, LLP.

(57) ABSTRACT

A solid electrolytic capacitor includes a capacitor element which includes an anode foil and a cathode foil rolled with a separator interposed therebetween, and a solid electrolyte layer or an electrically conductive polymer layer provided therein. The cathode foil is coated with a film of a metal nitride or a non-valve metal. The cathode foil has a smaller width than the anode foil, and the anode foil has substantially the same width as the separator.

3 Claims, 2 Drawing Sheets

SOLID ELECTROLYTIC CAPACITOR

TECHNICAL FIELD

The present invention relates to a solid electrolytic capacitor which includes an anode foil and a cathode foil rolled together.

BACKGROUND ART

FIG. 2 is a sectional front view of a prior art solid electrolytic capacitor 1, and FIG. 3 is a perspective view of a capacitor element 2 (see, for example, Japanese Examined Patent Publication No. HEI4-19695(1992)).

The solid electrolytic capacitor 1 includes an aluminum case 3 having a top opening, the capacitor element 2 contained in the case 3, and a rubber packing 30 which seals the opening of the case 3. An upper edge portion of the case 3 is curved to fix the packing 30, and a plastic seat plate 31 is attached to the top of the case 3. Lead wires 21, 21 extend from the capacitor element 2 through the packing 30 and the seat plate 31, and then bent laterally.

As shown in FIG. 3, the capacitor element 2 includes a roll element 20 including an anode foil 4 of an aluminum foil coated with a dielectric oxide film and a cathode foil 5 of an aluminum foil, which are rolled together into a roll with a separator 6 of an insulative material such as paper interposed therebetween and fixed by a tape 26. The roll element includes a solid electrolyte such as a TCNQ (7,7,8,8-tetracyanoquinodimethane) complex salt impregnated therein, or an electrically conductive polymer layer provided therein. Lead tabs 25, 25 respectively extend from the anode foil 4 and the cathode foil 5, and the lead wires 21, 21 respectively extend from the lead tabs 25, 25.

Although the solid electrolytic capacitor 1 having such a construction is widely used, there is a market demand for a capacitor having a smaller size and a greater capacitance. To this end, a capacitor has been proposed whose cathode foil 5 is coated with a metal nitride film as described below (see, for example, Japanese Unexamined Patent Publication No. 2000-114108).

An explanation will be given to the principle of the capacitance increase of the capacitor by coating the cathode foil 5 with the metal nitride film. In general, the dielectric oxide film is not intentionally formed on the cathode foil 5, but formed by natural oxidation. Therefore, the capacitance C of the capacitor is equivalent to a capacitance obtained by connecting the capacitance Ca of the anode foil 4 and the capacitance Cc of the cathode foil 5 in series, and represented by the following equation:

$$C = Ca \times Cc/(Ca+Cc) = Ca \times 1/(Ca/Cc+1)$$

That is, if the cathode foil 5 has the capacitance Cc, the capacitance C of the capacitor is smaller than the capacitance Ca of the anode foil 4.

Where a film 50 of a metal nitride such as TiN is formed on the cathode foil 5 by sputtering or vapor deposition as shown in FIG. 4, however, molecules of the metal nitride supposedly intrude into the oxide film 51 to contact an aluminum base of the cathode foil 5. Therefore, the base and the metal nitride are electrically connected to each other, so that the cathode foil 5 has no capacitance. Thus, the capacitance of the capacitor can be increased without size increase of the capacitor.

A non-valve metal may be employed instead of the metal nitride for the formation of the film. A valve metal herein means a metal naturally coated with its oxide, and examples thereof include tantalum and niobium in addition to aluminum.

However, the aforesaid capacitor has the following drawbacks.

The capacitor of this type is required to have a lower ESR (equivalent series resistance) as well as a higher capacitance. To this end, the width of the anode foil 4 or the cathode foil 5 as measured vertically should be increased. However, the vertical widths of the anode foil 4 and the cathode foil 5 cannot be increased to greater than the width of the separator 6. Widening the separator 6 is contradictory to the size reduction of the capacitor.

If the anode foil 4 and the cathode foil 5 each have the same vertical width as the separator 6 or a vertical width slightly smaller than the width of the separator 6, the foils 4 and 5 are brought into contact with each other due to a rolling shift of the foils 4, 5, thereby increasing the possibility of an increase in leak current or a defective due to a short circuit. Therefore, the foils 4, 5 each have a width smaller than the width of the separator 6 by about 0.5 mm to about 1 mm.

In view of the fact that the cathode foil 5 coated with the metal nitride film has no capacitance, the inventor has conceived the idea of reducing the width of the cathode foil 5 coated with the metal nitride film for preventing the foils 4 and 5 from contacting each other.

It is therefore an object of the present invention to provide a capacitor having an increased capacitance, a reduced ESR and a smaller size while suppressing a defective due to contact between foils 4 and 5 of the capacitor.

DISCLOSURE OF THE INVENTION

A solid electrolytic capacitor 1 comprises a capacitor element 2 which includes an anode foil 4 and a cathode foil 5 rolled with a separator 6 interposed therebetween, and a solid electrolyte layer or an electrically conductive polymer layer provided therein. The cathode foil 5 is coated with a film 50 of a metal nitride or a non-valve metal. The cathode foil 5 has a smaller width than the anode foil 4, and the anode foil 4 has substantially the same width as the separator 6.

BEST MODE FOR CARRYING OUT THE INVENTION

One embodiment of the present invention will hereinafter be described in detail with reference to the attached drawings.

Figure 1:
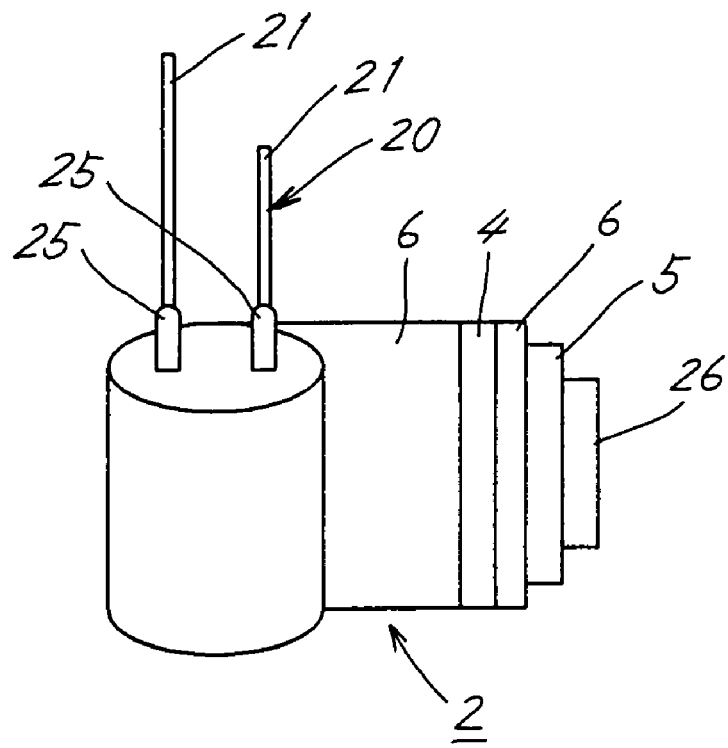
FIG. 1 is a perspective view of a capacitor element.
Figure 2:
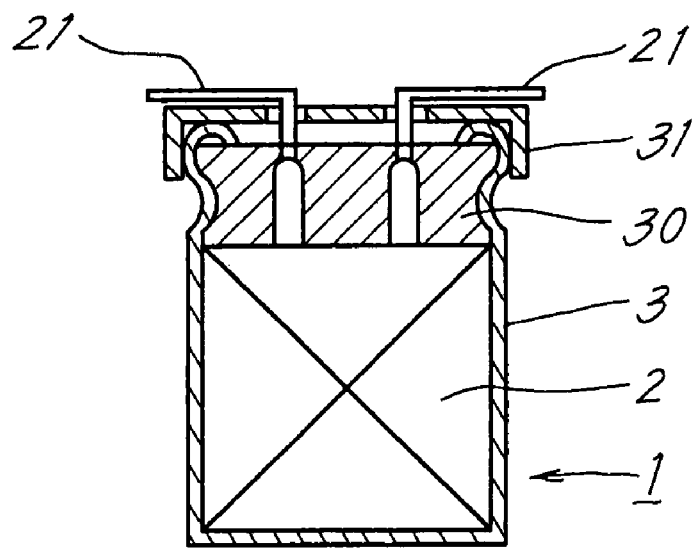
FIG. 2 is a sectional front view of a prior art solid electrolytic capacitor.
Figure 3:
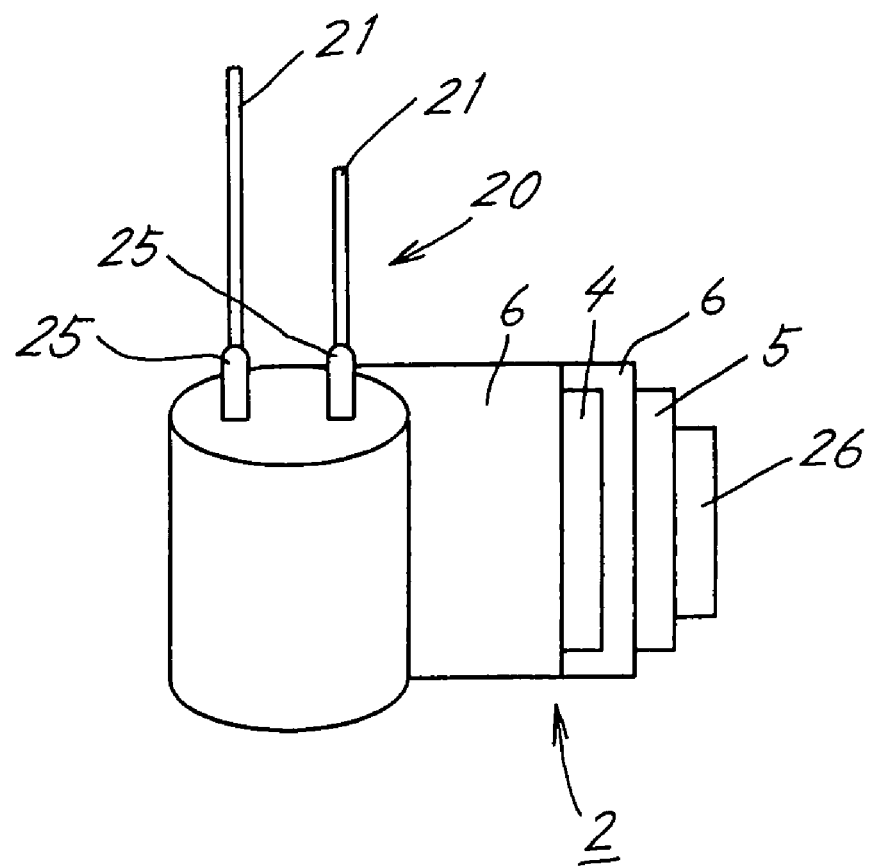
FIG. 3 is a perspective view of a prior art capacitor element.
Figure 4:
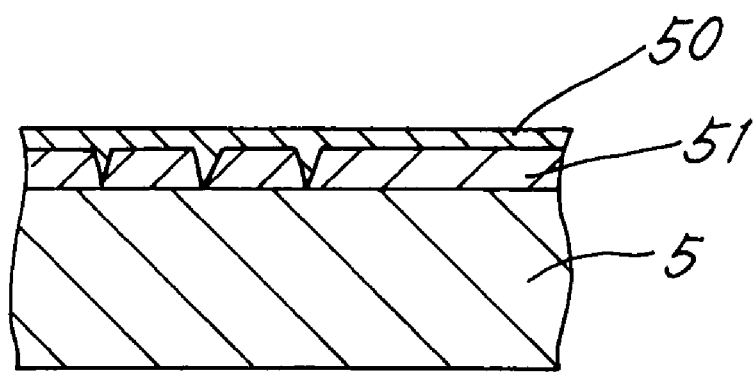
FIG. 4 is a sectional view for explaining how a metal nitride film intrudes into an oxide film to reach a base.

A solid electrolytic capacitor 1 has substantially the same overall construction as the prior art capacitor shown in FIG. 2. As shown in FIG. 1, a capacitor element 2 includes a roll element 20 including an anode foil 4 of an aluminum foil having an electrochemically formed film and a cathode foil 5 of an aluminum foil, which are rolled together into a roll with an insulative separator 6 interposed therebetween and fixed by a tape 26. The roll element 20 is impregnated with a solid electrolyte such as a TCNQ complex salt, or includes an electrically conductive polymer layer provided therein. A pair of lead wires 21, 21 extend from the roll element 20.

A film including a titanium (Ti) thin layer and a titanium nitride thin layer is provided on the cathode foil 5. Hence, the cathode foil 5 has no capacitance as described above or, if any, the capacitance thereof is negligible. Therefore, the width of the cathode foil 5 never influences the capacitance of the capacitor. The film may be composed of a non-valve metal as described above.

The anode foil 4 has substantially the same vertical width as the separator 6. The width of the cathode foil 5 is greater than 50% and smaller than 100% of the width of the anode foil 4.

The capacitor element 2 is produced in the following manner. Since the anode foil 4 is prepared by cutting an aluminum sheet, end faces of the anode foil 4 are formed with no dielectric oxide film. Therefore, the roll element 20 is subjected to an electrochemical process to form dielectric oxide films on the end faces of the anode foil 4. Thereafter, the roll element 20 is thermally treated at 280° C. for stabilization of the characteristic properties of the dielectric oxide films.

In turn, the roll element 20 is impregnated with a mixture solution containing n-butyl alcohol as a diluent, 3,4-ethylenedioxythiophene and iron(III) p-toluenesulfonate, followed by thermal polymerization. Thus, an electrically conductive polymer layer is formed between the foils 4 and 5, whereby the capacitor element 2 is completed. The capacitor element 2 is sealed in the case 3, whereby the solid electrolytic capacitor 1 is completed.

In this embodiment, the electrically conductive polymer layer is formed of an electrically conductive polythiophene polymer, but may be formed of a polypyrrole or polyaniline functional polymer. Instead of the electrically conductive polymer layer, a solid electrolyte layer such as of a TCNQ complex salt may be formed.

Experiment Results

The inventor prepared three types of capacitor elements 2 (40 capacitor elements 2 for each type) whose cathode foils 5 had widths which were 90%, 80% and 60%, respectively, of the widths of anode foils 4, and produced solid electrolytic capacitors 1 of Examples 1, 2 and 3 by employing these three types of capacitor elements. The vertical widths of the anode foils 4 were each substantially the same as the width of a separator 6 but not greater than the width of the separator 6.

Further, the inventor prepared two types of capacitor elements 2 (40 capacitor elements 2 for each type) whose cathode foils 5 and anode foils 4 had widths which were 75% and 100%, respectively, of the widths of separators 6, and produced solid electrolytic capacitors 1 of Prior Art Examples 1 and 2 by employing these two types of capacitor elements. The cathode foils 5 of the capacitor elements 2 of Prior Art Examples 1 and 2 were formed with no metal nitride film. The capacitors thus produced each had a rated voltage of 4V, and cases 3 of the capacitors each had an outer diameter of 8.0 mm and a height of 17.0 mm.

Defective ratios observed during a rolling process, and defective ratios and leak current (LC) defective ratios observed after the production of the capacitors of Examples 1, 2 and 3 and Prior Art Examples 1 and 2 are shown (in units of %) in Table 1.

TABLE 1

|  | Rolling process | Inspection process | |
|---|---|---|---|
|  | Short circuit defective ratio | LC defective ratio | Short circuit defective ratio |
| Example 1 | 0.45 | 2.25 | 0.00 |
| Example 2 | 0.32 | 1.78 | 0.00 |
| Example 3 | 0.20 | 0.65 | 0.00 |
| Prior Art Example 1 | 0.31 | 1.49 | 0.00 |
| Prior Art Example 2 | 32.3 | 42.5 | 21.8 |

As can be understood from Table 1, the capacitor of Prior Art Example 2 in which the cathode foil 5 and the anode foil 4 each have the same width as the separator 6 is much higher in short circuit defective ratios and leak current defective ratio in the rolling process and the inspection process and, hence, is not suitable for mass production.

Next, capacitances ("Cap" in units of μF) and dielectric losses ("tanδ" in units of %) were measured by applying a rated AC voltage at 120 Hz, and equivalent series resistances ("ESR" in units of mΩ) were measured by applying a rated AC voltage at 100 kHz. Further, leak currents ("LC" in units of μA) were measured after a rated DC voltage was applied for two minutes. The results of the measurement are shown as average values in Table 2.

TABLE 2

|  | Cap | tanδ | ESR | LC |
|---|---|---|---|---|
| Example 1 | 720 | 2.4 | 20 | 15 |
| Example 2 | 719 | 2.5 | 21 | 12 |
| Example 3 | 719 | 2.4 | 22 | 9 |
| Prior Art Example 1 | 560 | 2.4 | 25 | 13 |
| Prior Art Example 2 | 720 | 2.5 | 20 | 361 |

As can be understood from Table 2, the capacitor of Prior Art Example 1 in which the anode foil 4 has a width which is 75% of the width of the separator is much lower in capacitance. Therefore, the anode foil 4 needs to have substantially the same width as the separator 6 for increasing the capacitance of the capacitor.

As can be understood from Tables 1 and 2, where the width of the cathode foil 5 is greater than 50% and smaller than 100% of the width of the anode foil 4 and the anode foil 4 has substantially the same width as the separator 6, the capacitance increase and the ESR reduction of the capacitor can be achieved with the process defective ratios (the short circuit defective ratios and the leak current defective ratio) maintained at conventional levels.

INDUSTRIAL APPLICABILITY

Since the cathode foil 5 is formed with the film of a metal nitride or a non-valve metal, the cathode foil 5 has no capacitance or, if any, the capacitance thereof is negligible. Therefore, the capacitance of the capacitor is determined by the capacitance of the anode foil 4.

The anode foil 4 has substantially the same width as the separator 6, so that the anode foil 4 has a smaller ESR and a greater capacitance. Namely, the capacitance of the capacitor (1) becomes greater than a capacitor in which the anode foil (4) has a smaller width than that of the separator (6) for both foils (4)(5) to prevent contact with each other. Since the cathode foil (5) has a smaller width than the anode foil (4), unwanted contact between the foils (4) and (5) can be prevented while maintaining capacitance unchanged. Therefore, an increase in leak current and a defective due to a short circuit can be prevented.

What is claimed is:

1. A solid electrolytic capacitor comprising a capacitor element which includes an anode foil and a cathode foil rolled with a separator interposed therebetween, and a layer of a solid electrolyte or an electrically conductive polymer provided therein, wherein the cathode foil is coated with a film of a metal nitride or a non-valve metal, wherein the anode foil has substantially the same width as the separator to make capacitance greater than a capacitor in which the anode foil has smaller width than that of the separator to prevent contact with the cathode, wherein the cathode foil has a smaller width than that of the anode foil for both foils to prevent contact each other while maintaining capacitance unchanged.

2. A solid electrolytic capacitor as set forth in claim 1, wherein the width of the cathode foil is greater than 50% and smaller than 100% of the width of the anode foil.

3. A solid electrolytic capacitor as set forth in claim 1, wherein the electrolyte in the capacitor element is an electrically conductive polythiophene polymer.

* * * * *